M. E. & H. E. McDONNELL.
HORN ARTICLE.
APPLICATION FILED NOV. 26, 1907.
932,888.
Patented Aug. 31, 1909.
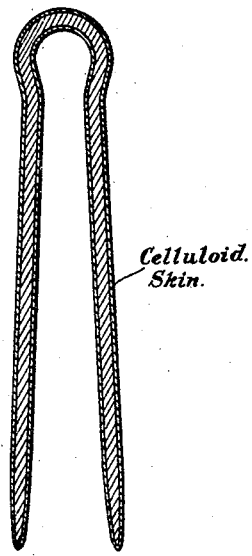
Celluloid.
Skin.
Witnesses
H. Löwenstein
James H. Man
Inventor
Michael E. McDonnell
Herbert E. McDonnell
By Edward E. Clement
Attorney

UNITED STATES PATENT OFFICE.

MICHAEL E. McDONNELL AND HERBERT E. McDONNELL, OF LEOMINSTER, MASSACHUSETTS.

HORN ARTICLE.

932,888.  Specification of Letters Patent.  Patented Aug. 31, 1909.

Application filed November 26, 1907. Serial No. 403,963.

*To all whom it may concern:*

Be it known that we, MICHAEL EUGENE McDONNELL and HERBERT E. McDONNELL, citizens of the United States, residing at Leominster, in the county of Worcester and State of Massachusetts, have invented certain new and useful Improvements in Horn Articles, of which the following is a specification, reference being had therein to the accompanying drawing.

Our invention relates to articles of personal wear manufactured from substances like animal horn, shell or hoof, and to the method of manufacturing the same.

It has for its object the improvement of such articles and methods in the particulars which will hereinafter be pointed out.

It is a well known fact that almost all animal substances, many vegetable substances, and some minerals, are injuriously affected by exposure to moisture in any form. The rate of deterioration varies with different substances, and with some is quite rapid, while with others it is slow. Horn is peculiarly liable to damage from moisture, which softens it, so that the article composed of this substance will not retain its shape, especially where it has been artificially produced, after exposure. Articles manufactured from the other substances mentioned are subject to the same objections as those made from horn, but in varying degrees. In addition to the objection stated, however, there is a further drawback in that articles made from some or all of the substances named and especially horn, will not take a high finish, nor is their finish when acquired as durable as on some other substances, such for example as nitrocellulose compounds. Nevertheless, the natural substances like horn are safer, especially for personal wear, than the nitrocellulose, because of the inflammable nature of the latter; and where horn can be kept dry, it possesses a rigidity which artificial compounds do not have.

The object of our invention is to produce articles from the natural substances named in such a manner that the said substances will be fully protected from moisture, a high finish can be obtained, and no risk will be incurred from combustion or explosion.

Briefly stated, the invention consists in forming articles such as hair pins, combs, barrettes, and the like, of a natural substance and particularly horn or shell, and then coating the same with a nitro-cellulose compound, which is evaporated to produce a thin, tough and highly adherent skin completely covering the natural substance so as to protect it, and at the same time giving a high finish. Except for this improved finish, there is nothing to indicate to the eye that the coating has been applied, the skin being not only very thin, but substantially transparent, so that the natural color of the horn or shell, and the transmission of light therethrough, remain unchanged.

A conventional embodiment of the invention is illustrated in the accompanying drawing which shows a section of a hair pin.

In this drawing the body substance is shown as horn, covered with a celluloid skin. The relative proportions of the body and skin are exaggerated for the purpose of illustration, and it should be understood that the latter is so thin that under actual conditions as they exist in practice, it is scarcely perceptible when viewed in section. In the manufacture of these pins and other articles, we first form the bodies of horn or shell, shape them and produce a rough or primary finish, which however is imperfect as compared to the final finish. The articles in this condition are then dipped in a solution made in the same manner as a celluloid solution, either with or without camphor. We prefer the use of camphor in the compound, in the proportion of one (1) part by weight of camphor to two (2) parts by weight of soluble nitrated cellulose, which is the same as the ordinary nitrated cellulose (cotton or tissue paper) used in the manufacture of collodion, celluloid, etc. This makes a stiffer body when it is dry and one that takes a higher finish than that produced by a solution made without camphor.

The best solution we have found up to this time, is composed of one (1) part by weight of nitrated cellulose and camphor mixed in the above proportions, to five (5) parts by weight of amyl acetate. If a quicker drying solution is required, it can be had by substituting for the amyl acetate a mixture of equal parts of amyl acetate and acetone.

It will be understood that while we prefer in general to use the compound stated, we are not necessarily limited thereto, but may use several other cellulose compounds dissolved in ether, alcohol, acetone, amyl acetate, glacial acetic acid, or other nitro-cellulose solvent.

While we have illustrated a hair pin as a typical embodiment of the invention, it will of course be understood that the invention also applies to various other articles.

Having thus described our invention what we claim and desire to secure by Letters Patent is—

1. An article of personal wear having a body formed of material such as horn, hoof or shell, and a thin, closely adherent and substantially transparent skin of celluloid covering the same.

2. A hair pin having its body formed of material such as horn, and a thin, closely adherent and substantially transparent skin deposited thereon out of a nitro-cellulose solution, said skin protecting the body from the effects of moisture, producing a high finish thereon, and preserving the natural color and quality of light transmission therethrough.

In testimony whereof we affix our signatures in presence of two witnesses.

MICHAEL E. McDONNELL.
  HERBERT E. McDONNELL.

Witnesses:
 Wm. A. Putnam,
 C. T. Fretts.